(12) United States Patent
Ito et al.

(10) Patent No.: US 7,061,748 B2
(45) Date of Patent: Jun. 13, 2006

(54) MULTILAYER CERAMIC CAPACITOR

(75) Inventors: Kazushige Ito, Tokyo (JP); Akira Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/165,286

(22) Filed: Jun. 24, 2005

(65) Prior Publication Data

US 2005/0286208 A1 Dec. 29, 2005

(30) Foreign Application Priority Data

Jun. 28, 2004 (JP) ............................. 2004-189634

(51) Int. Cl.
*H01G 4/06* (2006.01)
*C04B 35/46* (2006.01)

(52) U.S. Cl. ................. 361/321.4; 361/321.5; 501/137

(58) Field of Classification Search .. 361/321.4–321.5; 501/137, 139
See application file for complete search history.

(56) References Cited

U.S. PATENT DOCUMENTS

| | | | |
|---|---|---|---|
| 6,225,250 B1 | 5/2001 | Wada et al. | |
| 6,403,513 B1* | 6/2002 | Sato et al. | 501/137 |
| 6,699,809 B1* | 3/2004 | Fujikawa et al. | 501/138 |
| 6,764,976 B1* | 7/2004 | Kobayashi et al. | 501/139 |
| 2005/0219794 A1* | 10/2005 | Iguchi et al. | 361/321.2 |
| 2005/0286207 A1* | 12/2005 | Ito et al. | 361/321.2 |

FOREIGN PATENT DOCUMENTS

| | | |
|---|---|---|
| EP | 0 504 756 | 9/1992 |
| EP | 0 877 399 | 11/1998 |
| EP | 1 094 477 | 4/2001 |
| JP | 2001-31467 | 2/2001 |
| JP | 3341003 | 8/2002 |
| JP | 3348081 | 9/2002 |

OTHER PUBLICATIONS

U.S. Appl. No. 11/166,172, filed Jun. 27, 2005, Ito et al.
U.S. Appl. No. 11/077,281, filed Mar. 11, 2005, Iguchi et al.

* cited by examiner

*Primary Examiner*—Eric W. Thomas
(74) *Attorney, Agent, or Firm*—Oblon, Spivak, McClelland, Maier & Neustadt, P.C.

(57) ABSTRACT

A multilayer ceramic capacitor containing dielectric layers, in which each of the dielectric layers has a main component containing barium titanate, a first auxiliary component containing at least one kind selected from MgO, CaG, BaO, and SrO, a second auxiliary component containing a silicon oxide as a main component, a third auxiliary component containing at least one kind selected from the group consisting of $V_2O_5$, $MoO_3$, and $WO_3$, a fourth auxiliary component containing an oxide of at least one kind of first rare-earth element (R1) selected from Sc, Er, Tm, Yb, and Lu, a fifth auxiliary component containing $CaZrO_3$ or a mixture ($CaO+ZrO_2$) of CaO and $ZrO_2$, and a liquid phase addition of organic metal salts of Zr and Ca.

6 Claims, 3 Drawing Sheets

MULTILAYER CERAMIC CAPACITOR

BACKGROUND OF THE INVENTION

1. Field of the Invention

The present invention relates to a multilayer ceramic capacitor and, in particular, relates to a multilayer ceramic capacitor that is excellent in reliability wherein the capacitance-temperature characteristic, i.e. a time-dependent change in capacitance, satisfies the EIA standard X8R characteristic ($\Delta C/C = \pm 15\%$ at $-55$ to $+150°$ C.) and the resistance change ratio in an acceleration test is small (average life is long).

2. Description of the Related Art

Multilayer ceramic capacitors (multilayer chip capacitors), for example, are widely used as small-size, large-capacity, highly-reliable electronic components. In recent years, following miniaturization and higher performance of devices, the demand for further miniaturization, larger capacitance, lower price, and higher reliability has been increasing more and more with respect to the multilayer ceramic capacitors.

Normally, the multilayer ceramic capacitor is manufactured by alternately stacking in layers an internal electrode layer forming paste and a dielectric layer forming paste by the use of a sheet method, a printing method, or the like and simultaneously burning internal electrode layers and dielectric layers in a stack structure.

As a conductive material of the internal electrode layers, use has generally been made of Pd or a Pd alloy. However, since Pd is expensive, a base metal such as Ni or a Ni alloy, which is relatively cheap, has started to be used in recent years.

When the base metal such as Ni or the Ni alloy is used as the conductive material of the internal electrode layers, the internal electrode layers are oxidized if burning is carried out in the atmosphere. Therefore, the simultaneous burning of the dielectric layers and the internal electrode layers needs to be carried out in a reducing atmosphere. However, when the burning is performed in the reducing atmosphere, the dielectric layers are reduced so that the resistivity decreases. In view of this, an unreducible dielectric material has been developed.

However, with respect to a multilayer ceramic capacitor using the unreducible dielectric material, there is a problem that the IR (insulation resistance) extremely decreases due to application of an electric field (i.e. the IR life is short) so that the reliability is lowered.

Further, there arises a problem that when the dielectric is exposed to a DC electric field, a relative permittivity $\epsilon r$ decreases with the lapse of time. There is also a problem that there are those instances where a capacitor is used while being superimposed with a DC voltage and, in general, when a DC voltage is applied to a capacitor having a dielectric made of a ferroelectric material as a main component, there occurs degradation in characteristic where the permittivity changes depending on the applied DC voltage (which is called a DC bias characteristic) or in capacitance-temperature characteristic of the DC voltage application (which is called a Tc bias characteristic). Particularly, when dielectric layers are reduced in thickness for achieving miniaturization and increase in capacitance of a multilayer ceramic capacitor in response to the demand in recent years, since electric fields applied to the dielectric layers upon the application of DC voltage increase, the problem becomes remarkable wherein the time-dependent change in relative permittivity $\epsilon r$, i.e. the time-dependent change in capacitance, extremely increases or the Tc bias characteristic degrades.

Further, the multilayer ceramic capacitor is also required to be excellent in temperature characteristic and is particularly required, depending on a use, to have a flat temperature characteristic under severe conditions. In recent years, various electronic devices such as an engine electronic control unit (ECU), a crank angle sensor, and an antilock brake system (ABS) module that are mounted in an engine room of an automobile are required to be excellent in circuit temperature stability because those electronic devices are used for stably executing an engine control, a driving control, and a braking control, respectively.

It is expected that, in an environment where those electronic devices are used, the temperature drops to about $-20°$ C. or below in the winter in a cold district while it rises to about $+130°$ C. in the summer at the start of the engine. Recently, there is a tendency to shorten wire harnesses that connect between electronic devices and their control object devices and therefore there are those instances where the electronic devices are disposed outside a car. Accordingly, the environment for the electronic devices is becoming more severe. Therefore, capacitors for use in those electronic devices are each required to have a flat temperature characteristic over a wide temperature range.

As a temperature compensation capacitor material excellent in temperature characteristic, there are generally known $(Sr, Ca)(Ti, Zr)O_3$ based compositions, $Ca(Ti, Zr)O_3$ based compositions, and so on. However, since these compositions each have a very low relative permittivity, it is practically impossible to manufacture a capacitor having a large capacitance.

As a dielectric porcelain composition having a high permittivity and a flat capacitance-temperature characteristic, there is known a composition containing $BaTiO_3$ as a main component, $Nb_2O_5$—$Co_3O_4$, MgO—Y, a rare-earth element (Dy, Ho, or the like), $Bi_2O_3$—$TiO_2$, and so on. However, although the $BaTiO_3$ based high-permittivity material can satisfy the EIA standard X7R characteristic ($\Delta C/C = \pm 15\%$ at $-55$ to $+125°$ C.), it cannot be said that it is good enough for use in the automobile electronic devices used in the foregoing severe environment. For the electronic devices used in the foregoing severe environment, there is required a dielectric porcelain composition that satisfies the EIA standard X8R characteristic ($\Delta C/C = \pm 15\%$ at $-55$ to $+150°$ C.).

Under these circumstances, the present assignee has already proposed dielectric porcelain compositions each having a high relative permittivity and the X8R characteristic and capable of being burned in a reducing atmosphere (Japanese Patent No. 3348081, Japanese Patent No. 3341003, JP-A-2001-31467).

However, following further miniaturization of the multilayer ceramic capacitors, the demand for higher reliability is becoming more intense and further improvement in performance is required.

The present invention has been made under these circumstances and has an object to provide a multilayer ceramic capacitor that is excellent in reliability wherein the capacitance-temperature characteristic satisfies the EIA standard X8R characteristic ($\Delta C/C = \pm 15\%$ at $-55$ to $+150°$ C.) and the resistance change ratio in an acceleration test is small (IR average life is long).

SUMMARY OF THE INVENTION

In order to achieve the foregoing object, the present inventors have assiduously made researches on a composition of dielectric layers forming a multilayer ceramic capacitor and a Zr diffusion state of crystal grains forming the dielectric layers. As a result, the present inventors have found that the reliability characteristic of the capacitor is remarkably improved according to the Zr diffusion state of the crystal grains, and have reached the present invention.

Specifically, the present invention is a multilayer ceramic capacitor having a multilayer structure in which dielectric layers and internal electrode layers are alternately stacked, wherein each of the dielectric layers comprises a main component containing barium titanate, a first auxiliary component composed of at least one kind selected from the group consisting of MgO, CaO, BaO, and SrO, a second auxiliary component containing a silicon oxide as a main component, a third auxiliary component composed of at least one kind selected from the group consisting of $V_2O_5$, $MoO_3$, and $WO_3$, a fourth auxiliary component composed of an oxide of at least one kind of first rare-earth element (R1) selected from the group consisting of Sc, Er, Tm, Yb, and Lu, and a fifth auxiliary component composed of $CaZrO_3$ or a mixture ($CaO+ZrO_2$) of CaO and $ZrO_2$, wherein, assuming that, with respect to 100 mol of the main component containing barium titanate, the content (mol) of the first auxiliary component is given as y1, the content (mol) of the second auxiliary component is given as y2, the content (mol) of the third auxiliary component is given as y3, the content (mol) of the fourth auxiliary component is given as y4, and the content (mol) of the fifth auxiliary component is given as y5, a value of y1 falls within the range of 0.1 to 3.0 mol, a value of y2 falls within the range of 2 to 10 mol, a value of y3 falls within the range of 0.01 to 0.5 mol, a value of y4 falls within the range of 0.5 to 7 mol (representing the content of R1 alone), and a value of y5 falls within the range of 5 mol or less (not including zero), and wherein Zr diffuses in crystal grains forming the dielectric layers and, in the crystal grains each having an average grain diameter, the depth of a diffusion layer of Zr is 10 to 35% relative to the diameter of the crystal grain.

As a preferred mode of the present invention, it is configured such that the average grain diameter of the crystal grains forming the dielectric layers is 0.2 to 0.55 μm.

As a preferred mode of the present invention, it is configured such that the average grain diameter of the crystal grains forming the dielectric layers is 0.2 to 0.35 μm.

As a preferred mode of the present invention, it is configured such that the second auxiliary component containing the silicon oxide as the main component is a composite oxide containing $SiO_2$ as a main component and at least one kind selected from the group consisting of MO (M is at least one kind of element selected from the group consisting of Ba, Ca, Sr, and Mg), $Li_2O$, and $B_2O_3$.

As a preferred mode of the present invention, it is configured such that the second auxiliary component containing the silicon oxide as the main component is $(Ba, Ca)_xSiO_{2+x}$ where x is 0.7 to 1.2.

As a preferred mode of the present invention, it is configured such that each of the dielectric layers has a thickness of 2 to 7 μm.

DETAILED DESCRIPTION OF THE INVENTION

Hereinbelow, description will be given of the best mode for carrying out the present invention.

A multilayer ceramic capacitor taken up as one preferred example of an electronic component of the present invention will be described along with a dielectric porcelain composition being a component of the multilayer ceramic capacitor.

(Description of Multilayer Ceramic Capacitor)

Figure 1:
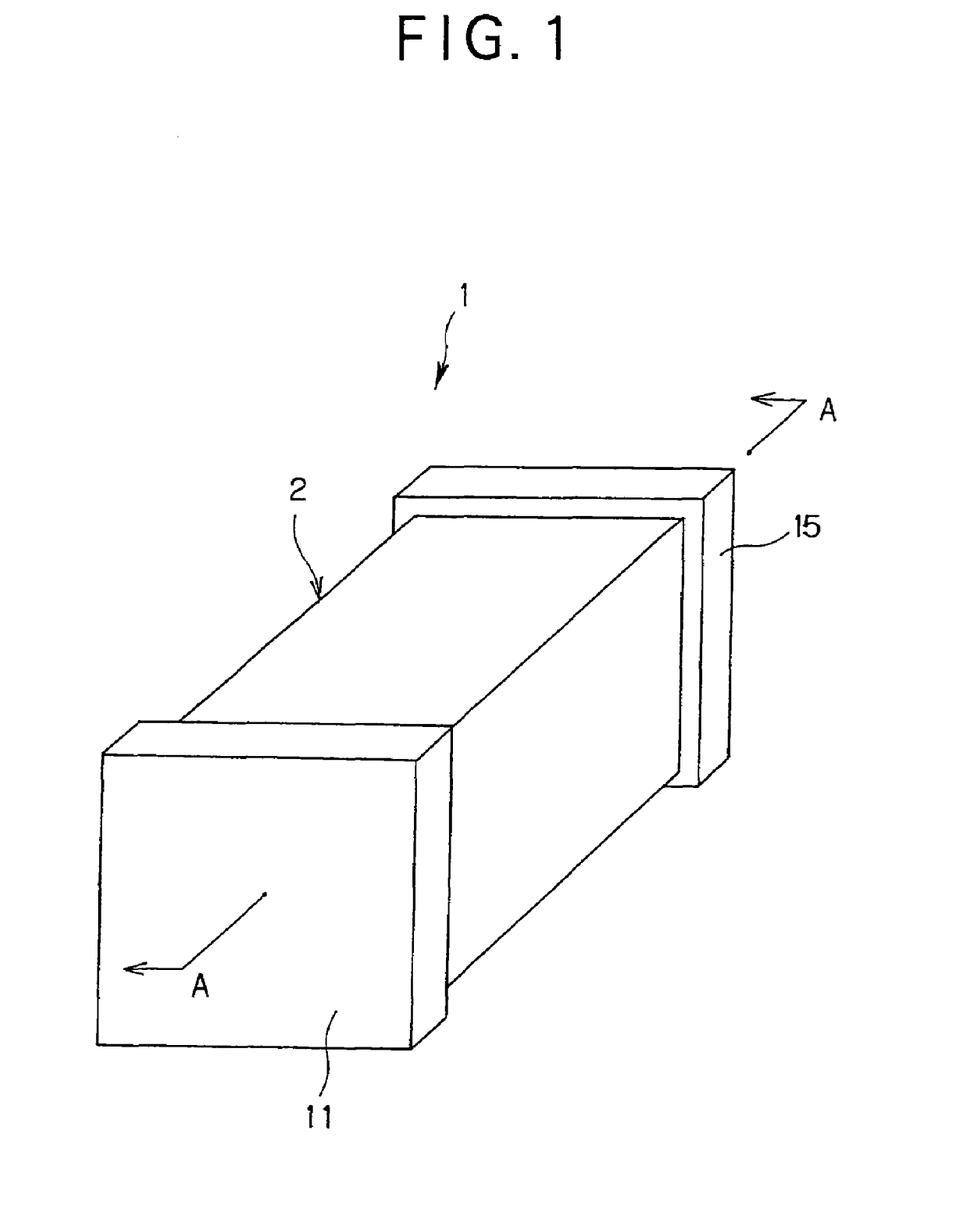
FIG. 1 is a perspective view showing a multilayer ceramic capacitor according to an embodiment of the present invention.
Figure 2:
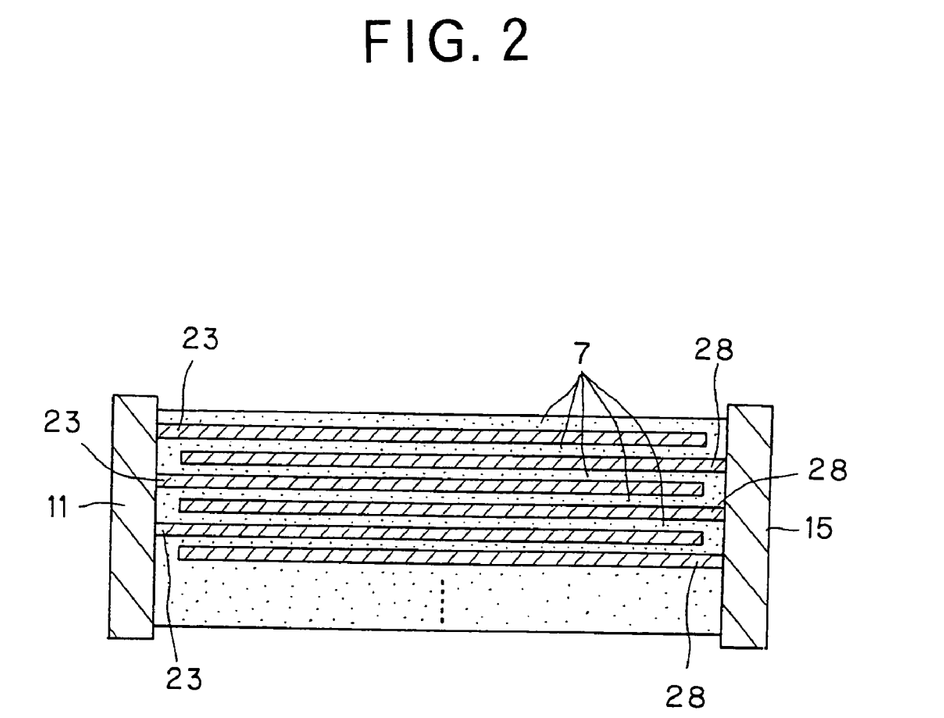
FIG. 2 is a sectional view of the multilayer ceramic capacitor taken along line A—A in FIG. 1.
Figure 3:
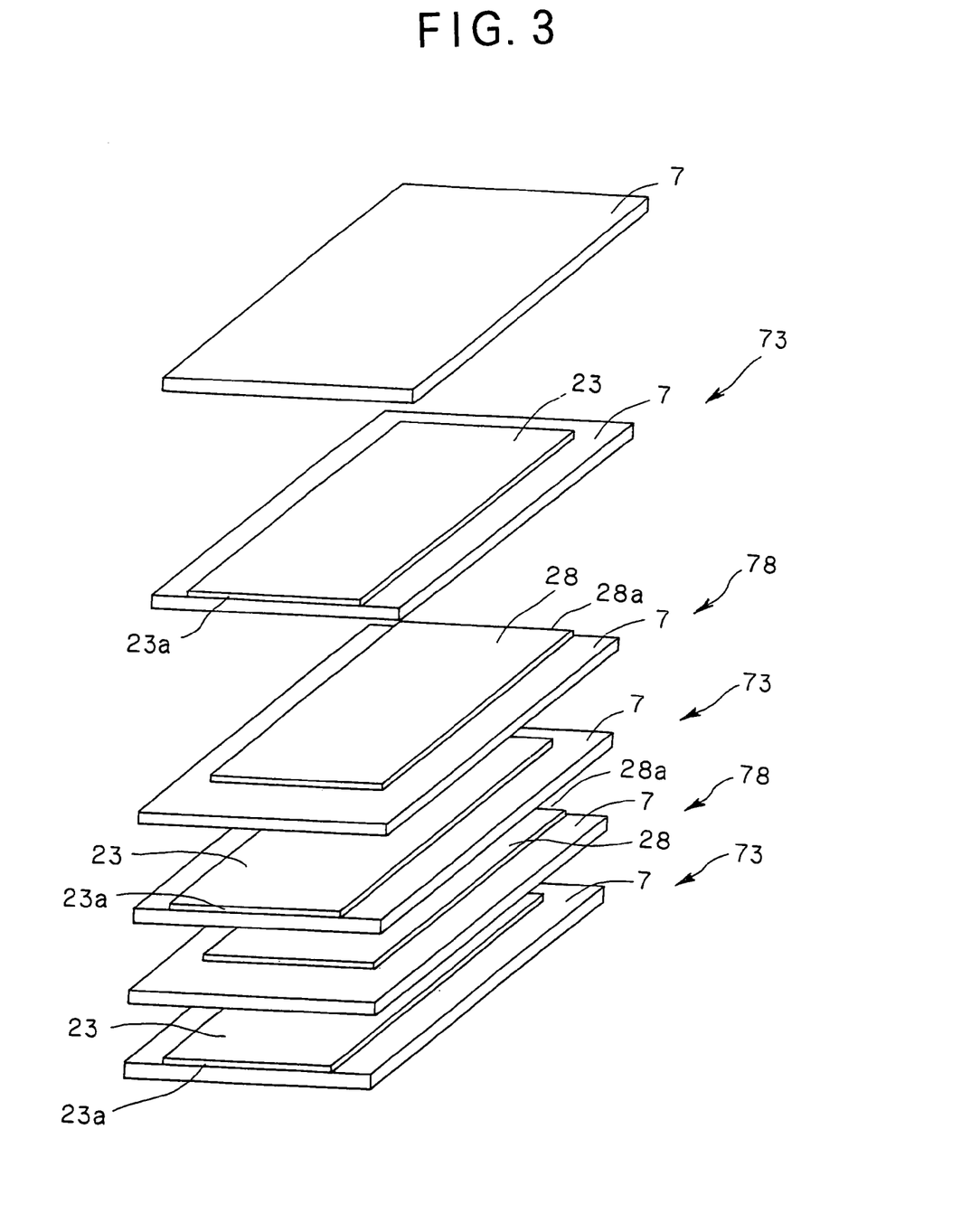
FIG. 3 is a perspective view for readily explaining the formation process of a multilayer structure.

Referring to FIGS. 1 to 3, description will be given of a schematic structure of a multilayer ceramic capacitor being one preferred example of an electronic component of the present invention. FIG. 1 is a perspective view showing one embodiment of the multilayer ceramic capacitor, FIG. 2 is a sectional view of the multilayer ceramic capacitor taken along line A—A in FIG. 1, and FIG. 3 is a perspective view for readily explaining the formation process of a multilayer structure.

As shown in FIGS. 1 to 3, the multilayer ceramic capacitor 1 of the present invention comprises an element body 2 in which first internal electrode layers 23 and second internal electrode layers 28 are alternately stacked via dielectric layers 7 interposed therebetween, and a pair of external electrodes 11 and 15 disposed at opposite end surfaces of the element body 2, respectively. The element body 2 normally has a rectangular parallelepiped shape, but there is no particular limitation to the shape thereof. There is also no particular limitation to the size of the element body 2 and its size can be properly set depending on a use and, for example, may be set to about (0.6 to 5.6 mm)×(0.3 to 5.0 mm)×(0.3 to 2.5 mm).

The internal electrode layers 23 and 28 in the present invention are, as described above, in the form of the first internal electrode layers 23 and the second internal electrode layers 28 that are alternately stacked via the dielectric layers 7 interposed therebetween. FIG. 3 shows a preferred example for forming such a structure. According to FIG. 3, sheet bodies 73 each having the dielectric layer 7 and the first internal electrode layer 23 and sheet bodies 78 each having the dielectric layer 7 and the second internal electrode layer 28 are repeatedly stacked in turn to form multilayers.

The stacked first internal electrode layers 23 each have, as shown in FIG. 3, a connecting portion 23a exposed to the side of the foregoing first external electrode 11 and this connecting portion 23a is connected to the first external electrode 11. As shown in FIG. 3, in relation to the dielectric layer 7, a portion of the first internal electrode layer 23, which is exposed from a peripheral frame of the dielectric layer 7, is only the connecting portion 23a (more precisely, only an end portion of the connecting portion 23a).

On the other hand, the stacked second internal electrode layers 28 each have, as shown in FIG. 3, a connecting portion 28a exposed to the side of the foregoing second external electrode 15 and this connecting portion 28a is connected to the second external electrode 15. As shown in FIG. 3, in relation to the dielectric layer 7, a portion of the second internal electrode layer 28, which is exposed from a peripheral frame of the dielectric layer 7, is only the connecting portion 28a (more precisely, only an end portion of the connecting portion 28a).

In the present invention, the first internal electrode layers 23 and the second internal electrode layers 28 may also be collectively referred to simply as "the internal electrode layers 23 and 28".

Structure of Dielectric Layer 7

The dielectric layer 7 is in the form of a sintered body composed of crystal grains of a dielectric porcelain composition having a main component containing barium titanate, a first auxiliary component composed of at least one kind selected from the group consisting of MgO, CaO, BaO, and SrO, a second auxiliary component containing a silicon oxide as a main component, a third auxiliary component composed of at least one kind selected from the group consisting of $V_2O_5$, $MoO_3$, and $WO_3$, a fourth auxiliary component composed of an oxide of at least one kind of first rare-earth element (R1) selected from the group consisting of Sc, Er, Tm, Yb, and Lu, and a fifth auxiliary component composed of $CaZrO_3$ or a mixture ($CaO+ZrO_2$) of CaO and $ZrO_2$.

The composition ratios of the first to fifth auxiliary components relative to 100 mol of barium titanate being the main component are as follows. Specifically, assuming that, with respect to 100 mol of the main component containing barium titanate, the content (mol) of the first auxiliary component is given as y1, the content (mol) of the second auxiliary component is given as y2, the content (mol) of the third auxiliary component is given as y3, the content (mol) of the fourth auxiliary component is given as y4, and the content (mol) of the fifth auxiliary component is given as y5, a value of y1 is set in the range of 0.1 to 3.0 mol, preferably 0.5 to 2.5 mol, a value of y2 is set in the range of 2 to 10 mol, preferably 2 to 5 mol, a value of y3 is set in the range of 0.01 to 0.5 mol, preferably 0.1 to 0.4 mol, a value of y4 is set in the range of 0.5 to 7 mol, preferably 0.5 to 5 mol, and a value of y5 is set to 5 mol or less (not including zero), preferably in the range of 0.5 to 3 mol.

It is to be noted that the foregoing mole number of the fourth auxiliary component is not a mole number of the oxide of the first rare-earth element (R1) but is a mole number of R1 alone. For example, when an oxide of Yb is used as the fourth auxiliary component, the mole number of the fourth auxiliary component being 1 mol does not represent that the mole number of $Yb_2O_3$ is 1 mol but represents that the mole number of Yb is 1 mol. That is, when 1 mol of $Yb_2O_3$ is contained, 2 mol of Yb is contained.

In this specification, the oxides forming the main component and the auxiliary components are each expressed by a stoichiometric composition, but an oxidation state of each oxide may fall outside the stoichiometric composition. However, the foregoing mole number of each auxiliary component is derived in terms of an oxide of a stoichiometric composition converted from a metal amount contained in an oxide forming each auxiliary component.

When the content of the first auxiliary component (at least one kind selected from the group consisting of MgO, CaO, BaO, and SrO) exceeds 3.0 mol so as to be too high, there tends to occur a disadvantage that the degree of sintering decreases. On the other hand, when it becomes less than 0.1 mol so as to be too low, there tends to occur a disadvantage that the capacitance-temperature change ratio increases, thereby lacking in stability in terms of temperature. MgO is particularly suitable for use as the first auxiliary component. When the first auxiliary component is composed of two or more kinds, their total is set in the foregoing range of 0.1 to 3.0 mol.

The second auxiliary component contains the silicon oxide as the main component. When the content of the second auxiliary component becomes less than 2 mol, the capacitance-temperature characteristic degrades and an IR (insulation resistance) decreases. On the other hand, when the content of the second auxiliary component exceeds 10 mol, there is a tendency that the IR life becomes insufficient and a rapid reduction in permittivity occurs.

The second auxiliary component is preferably a composite oxide containing $SiO_2$ as a main component and at least one kind selected from the group consisting of MO (M is at least one kind of element selected from the group consisting of Ba, Ca, Sr, and Mg), $Li_2O$, and $B_2O_3$. More preferably, the second auxiliary component is a composite oxide given as $(Ba, Ca)_x SiO_{2+x}$ where x is 0.7 to 1.2, preferably 0.8 to 1.1. When x is too small, i.e. when $SiO_2$ is excessive, there tends to occur a disadvantage that the dielectric property degrades due to reaction with the main component of barium titanate. On the other hand, when x is too large, there tends to occur a disadvantage that the melting point increases to reduce the degree of sintering. The ratio between Ba and Ca is arbitrary and only one of the elements may be contained.

The third auxiliary component (at least one kind selected from the group consisting of $V_2O_5$, $MoO_3$, and $WO_3$) mainly has an effect of flattening the capacitance-temperature characteristic at or above a Curie temperature and an effect of improving the IR life. When the content of the third auxiliary component becomes less than 0.01 mol, there tends to occur a disadvantage that those primary effects are not manifested. On the other hand, when it exceeds 0.5 mol, there tends to occur a disadvantage that the IR life is extremely reduced. $V_2O_5$ is particularly suitable for use as the third auxiliary component. When the third auxiliary component is composed of two or more kinds, their total is set in the foregoing range of 0.01 to 0.5 mol.

The fourth auxiliary component is the oxide of at least one kind of first rare-earth element (R1) selected from the group consisting of Sc, Er, Tm, Yb, and Lu. The fourth auxiliary component (oxide of R1) mainly has an effect of shifting the Curie temperature to a higher temperature side and an effect of flattening the capacitance-temperature characteristic. When the content of the fourth auxiliary component becomes less than 0.5 mol so as to be too low, there tends to occur a disadvantage that those primary effects cannot be manifested. On the other hand, when the content exceeds 7 mol so as to be too high, there tends to occur a disadvantage that the degree of sintering degrades. As the fourth auxiliary component, use is preferably made of the Yb oxide that exhibits a high characteristic improving effect and is yet inexpensive.

The fifth auxiliary component contains $CaZrO_3$ or the mixture ($CaO+ZrO_2$) of CaO and $ZrO_2$. The fifth auxiliary component mainly has an effect of shifting the Curie temperature to the higher temperature side and an effect of flattening the capacitance-temperature characteristic. Further, there is also an effect of improving the so-called CR product (the product of a capacitance (μF) and an insulation resistance (MΩ)) and a DC dielectric breakdown strength. When the fifth auxiliary component is not added, there tends to occur a disadvantage that those effects cannot be manifested and, when the content thereof exceeds 5 mol so as to be too high, there are instances where the IR life becomes insufficient and the capacitance-temperature characteristic (X8R characteristic) degrades. There is no particular limitation to an addition manner of $CaZrO_3$ as the fifth auxiliary component and there can be cited an oxide composed of Ca such as CaO, a carbonate such as $CaCO_3$, an organic compound, $CaZrO_3$, or the like. The ratio between Ca and Zr in the fifth auxiliary component is not particularly limited and may be determined to a degree that does not transform barium titanate into a solid solution. Normally, the mole ratio (Ca/Zr) of Ca relative to Zr is set to 0.5 to 1.5, preferably 0.8 to 1.5, and more preferably 0.9 to 1.1.

By adjusting the content of the fourth auxiliary component (R1 oxide) and the content of the fifth auxiliary component, it is possible to flatten the capacitance-temperature characteristic (X8R characteristic) and improve the high-temperature acceleration life and so on. Particularly, in the foregoing numerical value ranges, it is possible to suppress heterophase precipitation and uniformalize the structure.

Further, in the present invention, it is preferable that an oxide of at least one kind of second rare-earth element (R2) selected from the group consisting of Y, Dy, Ho, Tb, Gd, and Eu be contained as a sixth auxiliary component. The sixth auxiliary component (oxide of R2) mainly exhibits an effect of improving the IR life and has only a small adverse influence upon the capacitance-temperature characteristic. The content of the sixth auxiliary component is preferably set to 9 mol or less, particularly 0.5 to 9 mol with respect to 100 mol of barium titanate being the main component. It is to be noted that the mole number of the sixth auxiliary component is not a mole number of the oxide of the second rare-earth element (R2) but is a mole number of R2 alone. As the sixth auxiliary component, use is preferably made of the Y oxide that exhibits a high characteristic improving effect and is yet inexpensive.

The total content of the fourth auxiliary component and the sixth auxiliary component is preferably set to 13 mol or less, and more preferably 10 mol or less with respect to 100 mol of barium titanate. This is for keeping excellent the degree of sintering.

Further, in the present invention, MnO and $Cr_2O_3$ may be further contained as a seventh auxiliary component. The seventh auxiliary component can mainly manifest an effect of promoting the sintering and an effect of increasing the IR. The content of the seventh auxiliary component is set to 0.5 mol or less, particularly 0.01 to 0.5 mol with respect to 100 mol of the main component containing barium titanate. When the content thereof is too high, there is a tendency to adversely affect the capacitance-temperature characteristic.

In the dielectric porcelain composition of the present invention, $Al_2O_3$ may be contained in addition to the foregoing oxides. $Al_2O_3$ does not have much influence upon the capacitance-temperature characteristic but has an effect of improving the degree of sintering and the IR. However, when the content of $Al_2O_3$ is too high, there tends to occur degradation of the degree of sintering and reduction of the IR. Therefore, when adding $Al_2O_3$, the content thereof is preferably set to 1 mol or less with respect to 100 mol of barium titanate, and more preferably 1 mol % or less relative to the total of the dielectric porcelain composition.

The Curie temperature (phase transition temperature from a ferroelectric to a paraelectric) of the porcelain composition forming the dielectric layer 7 can be changed by selecting a chemical composition of the dielectric porcelain composition. However, in order to satisfy the X8R characteristic, the Curie temperature is preferably set to 120° C. or higher, and more preferably 123° C. or higher. The Curie temperature can be measured by DSC (differential scanning calorimetry) measurement or the like. When at least one kind among Sr, Zr, and Sn has substituted for Ba or Ti in barium titanate forming the perovskite structure, the Curie temperature shifts toward a lower temperature side so that the capacitance-temperature characteristic degrades at 125° C. or higher. Therefore, a barium titanate based composite oxide containing these elements (e.g. $(Ba, Sr)TiO_3$) should not be used as the main component as much as possible. However, if at least one kind among Sr, Zr, and Sn is contained only as impurities (e.g. the content thereof is about 0.1 mol % or less relative to the total of the dielectric porcelain composition), no problem arises.

Now, description will be given of crystal grains forming the dielectric layer 7 (hereinafter referred to as "dielectric grains").

The dielectric grains form the dielectric layer 7 as described above. In the present invention, it is characterized in that Zr diffuses in the dielectric grains and, in the crystal grains each having an average grain diameter, the depth of a diffusion layer of Zr is 10 to 35% relative to the diameter of the dielectric grain (crystal grain), and preferably 15 to 30%. Since a diffusion region of Zr is formed in an outer surface layer of the dielectric grain (crystal grain) in a shell fashion, it is set that $T/D \times 100 = 10$ to 35% where T represents the depth of the diffusion layer of Zr and D represents the diameter of the grain.

When a value of $T/D \times 100$ becomes less than 10%, the capacitance-temperature characteristic does not satisfy the EIA standard X8R characteristic ($\Delta C/C = \pm 15\%$ at −55 to +150° C.). Further, the particularly excellent average life cannot be obtained. The same problems arise when the value of $T/D \times 100$ exceeds 35%. The maximum value of $T/D \times 100$ according to the foregoing definition is 50%.

As parameters that can adjust the depth of the Zr diffusion layer, there can be cited various parameters such as a burning temperature, a burning time, a Ba/Ti ratio of the main component, an addition amount of the Zr compound being the fifth auxiliary component, use of a polymer dispersant, liquid phase addition by use of an organic salt, use of coat powder, and a calcination time. Particularly, the liquid phase addition by the use of the organic salt is effective in terms of uniformly forming the shell-shaped Zr diffusion layer on the outer periphery of each grain.

The depth of the Zr diffusion layer is derived by picking up a crystal grain having the average grain diameter, performing a linear analysis in a straight line from end to end of the grain with respect to the grain diameter by the use of a transmission electron microscope, then shifting the grain by 90 degrees and performing a linear analysis with respect to the same grain diameter, thereby deriving the depth of diffusion of Zr. This measurement is repeated with respect to n=10 grain samples and the average value is derived as the depth of the Zr diffusion layer.

The average grain diameter of the dielectric grains each having the Zr diffusion layer of such a predetermined depth may be set to, for example, about 0.1 to 3.0 μm depending on the thickness of each of the dielectric layers, preferably in the range of 0.2 to 0.55 μm and more preferably in the range of 0.2 to 0.35 μm. When the average grain diameter becomes less than 0.2 μm, the X8R characteristic may not be satisfied in the case where the dielectric layers are reduced in thickness (e.g. the thickness between the layers is set to less than 3.5 μm) or the element body is multilayered (e.g. the number of dielectric layers is set to 100 or more). On the other hand, when the average grain diameter of the dielectric grains exceeds 0.55 μm, the time-dependent change in capacitance tends to increase. The multilayer ceramic capacitor using the grain diameter in the preferable range of 0.2 to 0.35 μm exhibits the effect of being excellent in Tc bias characteristic, in addition to the foregoing features that the capacitance-temperature characteristic satisfies the EIA standard X8R characteristic and the time-dependent change in capacitance is small. Particularly, the multilayer ceramic capacitor excellent in Tc bias characteristic can be obtained by setting the average grain diameter of the dielectric grains to 0.35 μm or less.

Further, in the present invention, it is preferable that a value of (D100–D50) being a difference between the maximum grain diameter (D100) of the dielectric grains and the average grain diameter (D50) thereof be set to 0.1 μm or less.

In the present invention, the thickness of each of the dielectric layers is normally set to 40 μm or less, particularly 30 μm or less. The lower limit of the thickness is normally about 2 μm. The present invention is effective for improvement in capacitance-temperature characteristic of a multilayer ceramic capacitor having dielectric layers each reduced in thickness particularly to 2 to 7 μm. The number of dielectric layers is normally set to about 2 to 300.

The multilayer ceramic capacitor of the present invention is suitable for use as an electronic component for a device that is used in an environment of 80° C. or higher, particularly 125 to 150° C. In such a temperature range, the multilayer ceramic capacitor is excellent in reliability wherein the temperature characteristic of the capacitance satisfies the EIA standard X8R characteristic (ΔC/C=±15% at −55 to +150° C.) and the resistance change ratio in an acceleration test is small (average life is long).

Structure of Internal Electrode Layer 23, 28

There is no particular limitation to a conductive material contained in the internal electrode layer. However, since the forming material of the dielectric layer 7 has the reduction resistance as described above, a base metal can be used. The base metal used as the conductive material is preferably Ni or a Ni alloy. The Ni alloy is preferably an alloy of Ni and one kind or more selected from the group of Mn, Cr, Co, Al, W, and so on. The content of Ni in the Ni alloy is preferably 95 weight % or more.

In Ni or the Ni alloy, various components such as P, C, Nb, Fe, Cl, B, Li, Na, K, F, and S may be contained at 0.1 weight % or less. An average grain diameter of grains in a state of being contained in a paste before burning is set to 0.4 μm or less, preferably 0.01 to 0.2 μm. This is for realizing an reduction in thickness at a higher level.

The thickness of the internal electrode layer (internal electrode main layer) can be properly set depending on a use of the multilayer ceramic capacitor, or the like, for example, to 0.5 to 5 μm, particularly about 0.5 to 2.5 μm.

Structure of External Electrode 11, 15

There is no particular limitation to a conductive material contained in the external electrode. In the present invention, use can be made of inexpensive Ni or Cu, or an alloy thereof. The thickness of the external electrode can be properly determined depending on a use. Normally, the thickness thereof is set to about 10 to 50 μm.

For the purpose of improving the degree of sintering of the conductive material and ensuring adhesiveness to the stack body, glass may be contained in the external electrode.

Manufacturing Method of Multilayer Ceramic Capacitor

Now, description will be given of a method of manufacturing the multilayer chip capacitor of the present invention.

First, by the use of the normal printing or sheet method using pastes, the dielectric layers and the internal electrode layers are alternately stacked to prepare the original form (stack body) of the element body. Then, the external electrodes are formed at both end surfaces of the stack body on the external electrode sides by printing, transfer, bonding, dipping, or the like. Thereafter, burning is carried out to manufacture the multilayer chip capacitor. Details of the respective manufacturing processes will be described in order of (1) to (5) hereinbelow.

(1) Fabrication of Chip-Shaped Stack Body (Element Body)

When the so-called printing method is used, the dielectric layer forming paste and the internal electrode layer forming paste are printed in layers in turn on a support made of polyethylene terephthalate or the like. In this event, as shown in FIGS. 2 and 3, the first internal electrode layers 23 and the second internal electrode layers 28 are each printed so as to obtain a predetermined form with respect to the outer frame of the dielectric layer forming paste. After printing the dielectric layers and the internal electrode layers in turn, this composite is cut into a chip of a predetermined shape and then the layers are stripped from the support, thereby forming a chip-shaped stack body (element body original form).

On the other hand, when the so-called sheet method is used, a plurality of dielectric green sheets are formed by the use of the dielectric layer forming paste. The internal electrode layer forming paste is applied onto those green sheets so that the sheet bodies 73 and 78 as shown in FIG. 3 are formed. The sheet bodies 73 and 78 are stacked in layers in turn. Then, this composite is subjected to a predetermined heating and pressurization process and then cut into a chip, thereby forming a chip-shaped stack body (element body original form).

Description will be given hereinbelow of composition examples of pastes generally used in the foregoing process.

<Dielectric Layer Forming Paste>

As the dielectric layer forming paste, use is made of one obtained by kneading and dispersing a dielectric material and organic vehicle.

As the dielectric material, use can be made of the foregoing oxides and their mixtures and composite oxides. Other than those, use can be made of ones obtained by properly selecting from various compounds that become the foregoing oxides and composite oxides by burning, such as carbonate, oxalate, nitrate, hydroxide, and organic metal compounds, and mixing them. The content of each of the compounds in the dielectric material is determined so that the foregoing composition of the dielectric porcelain composition is obtained after the burning.

Normally, powder having an average grain diameter of about 0.1 to 5 μm is used as the dielectric material. The content of the dielectric material in the dielectric layer forming paste is normally set to about 30 to 80 weight %.

The organic vehicle used in the dielectric layer forming paste is obtained by dissolving a binder in an organic solvent. As the binder, use is made of a known resin binder such as ethyl cellulose, copolymer of polyvinyl butyral and methacrylic ester, or acrylic ester based copolymer. Further, as the organic solvent for dissolving the binder, use is made of an organic solvent such as terpineol, butyl carbitol, acetone, or toluene. There is no particular limitation to the content of the binder and the content of the organic solvent in the dielectric layer forming paste. Normally, the content of the binder is set to about 1 to 5 weight % and the content of the organic solvent is set to about 10 to 50 weight %.

<Internal Electrode Layer Forming Paste>

The internal electrode layer forming paste is prepared by kneading and dispersing the foregoing various conductive metals and alloys and the foregoing organic vehicle.

(2) Debinding Process

The chip-shaped stack body fabricated as described above is preferably applied with a debinding process before the burning. Conditions of this debinding process can be properly set in consideration of the used materials and so on. For example, when the base metal such as Ni or the Ni alloy is used as the conductive material of the internal electrode layers, it is particularly preferable to perform the debinding process under the following conditions.

Debinding Process Conditions

| | |
|---|---|
| Temperature Rise Rate | 5 to 300° C./hour, particularly 10 to 100° C./hour |
| Holding Temperature | 180 to 400° C., particularly 200 to 300° C. |
| Temperature Holding Time | 0.5 to 24 hours, particularly 5 to 20 hours |
| Atmosphere | in the air |

(3) Burning Process

An atmosphere at the time of the burning of the chip-shaped stack body in the present invention may be properly determined depending on the kind of conductive material in the internal electrode layer paste. When the base metal such as Ni or the Ni alloy is used as the conductive material, the oxygen partial pressure in the burning atmosphere is preferably set to $10^{-9}$ to $10^{-4}$ Pa. When the oxygen partial pressure is less than $10^{-9}$ Pa, there are those instances where the conductive material of the internal electrode layers causes abnormal sintering so that the internal electrode layers are interrupted. On the other hand, when the oxygen partial pressure exceeds $10^{-4}$ Pa, the internal electrode layers tend to be oxidized.

The holding temperature at the time of sintering is set to 1100 to 1400° C., preferably 1200 to 1360° C., and more preferably 1200 to 1320° C. When the holding temperature becomes less than 1100° C., there occurs a tendency that elaborateness becomes insufficient. On the other hand, when the holding temperature exceeds 1400° C., there tends to occur interruption of the electrode due to abnormal sintering of the internal electrode layers, degradation of the capacitance-temperature characteristic due to diffusion of the internal electrode layer forming material, or reduction of the dielectric porcelain composition.

Further, the temperature rise rate is preferably set to 50 to 500° C./hour, particularly 200 to 300° C./hour. The temperature holding time is preferably set to 0.5 to 8 hours, particularly 1 to 3 hours. The cooling rate is preferably set to 50 to 500° C./hour, particularly 200 to 300° C./hour. It is preferable that the burning atmosphere be a reducing atmosphere. It is preferable that, for example, a mixed gas of $N_2$ and $H_2$ be humidified and used as an atmosphere gas.

(4) Annealing Process

When burned in the reducing atmosphere, it is preferable to apply annealing to the stack body after the burning. The annealing is a process for reoxidizing the dielectric layers, which can remarkably prolong the acceleration life of insulation resistance.

The oxygen partial pressure of an annealing atmosphere is preferably set to $10^{-3}$ Pa or more, particularly $10^{-2}$ to 10 Pa. When the oxygen partial pressure is less than the foregoing range, reoxidation of the dielectric layers is difficult, while, when the oxygen partial pressure exceeds the foregoing range, there is a possibility that oxidation of the internal electrode layers proceeds.

The holding temperature of the annealing is preferably set to 1100° C. or less, particularly 500 to 1100° C. When the holding temperature is less than 500° C., reoxidation of the dielectric layers becomes insufficient so that the acceleration life of insulation resistance is shortened, while, when the holding temperature exceeds 1100° C., oxidation of the internal electrode layers proceeds so that not only the capacitance is reduced but also the acceleration life is shortened due to reaction with the dielectric material.

The annealing process may comprise only temperature rise and temperature drop. In this case, the temperature holding time is not necessary and the holding temperature represents the highest temperature. Further, the temperature holding time is preferably set to 0 to 20 hours, particularly 2 to 10 hours. $N_2$ and humidified $H_2$ gas are preferably used as an atmosphere gas.

In the foregoing debinding, burning, and annealing processes, use can be made of, for example, a wetter for humidifying $N_2$, $H_2$, the mixed gas, and so on. The water temperature in this case is preferably set to about 5 to 75° C.

The debinding, burning, and annealing processes may be carried out continuously or independently of each other. When these processes are carried out continuously, it is preferable to change the atmosphere without cooling after the debinding process, then gradually raise the temperature up to the holding temperature of the burning to perform the burning, then perform cooling, and then change the atmosphere when the holding temperature in the annealing process is reached, to thereby perform the annealing.

On the other hand, when those processes are carried out independently of each other, the debinding process raises the temperature to a predetermined holding temperature and, after holding for a predetermined time, drops the temperature to a room temperature. In this event, a debinding atmosphere is set to the same as that of the case where the processes are carried out continuously. The annealing process raises the temperature to a predetermined holding temperature and, after holding for a predetermined time, drops the temperature to the room temperature. In this event, an annealing atmosphere is set to the same as that of the case where the processes are carried out continuously. On the other hand, the debinding process and the burning process may be carried out continuously while only the annealing process may be carried out independently, or only the debinding process may be carried out independently while the burning process and the annealing process may be carried out continuously.

(5) External Electrode Forming Process

An external electrode forming paste is printed or transferred to opposite end surface sides of the chip-shaped stack body (element body original form) fabricated as described above. Then, burning is implemented to form the external electrodes. Alternatively, the external electrodes may be formed by applying the paste by dipping and then carrying out the burning.

Burning conditions for the external electrode paste are preferably set like, for example, about 10 minutes to one hour at 600 to 800° C. in a reducing atmosphere such as a mixed gas of $N_2$ and $H_2$.

<External Electrode Forming Paste>

As a conductive material of the external electrode forming paste, use is made of at least one kind of metal selected from Pd, Ag, Au, Cu, Pt, Rh, Ru, Ir, and so on, or an alloy thereof. The external electrode forming paste is prepared like the foregoing internal electrode layer paste.

Each of the foregoing various pastes may contain additives selected from various dispersants, plasticizers, dielectrics, insulators, and so on depending on necessity. The total content thereof is preferably set to 10 weight % or less.

The multilayer ceramic capacitor of the present invention manufactured as described above is provided with lead wires depending on necessity and mounted on a printed board or the like by soldering or the like.

Hereinbelow, specific examples will be cited to describe the present invention in further detail.

EXAMPLE 1

As starting materials for producing a dielectric material, there were provided a main component material ($BaTiO_3$) and materials of first to seventh auxiliary components having average grain diameters of 0.1 to 1.0 μm, respectively.

$MgCO_3$ was used as the material of the first auxiliary component, $(Ba_{0.6}Ca_{0.4})SiO_3$ was used as the material of the second auxiliary component, $V_2O_5$ was used as the material of the third auxiliary component, $Yb_2O3$ was used as the material of the fourth auxiliary component (R1), and $CaZrO_3$ and organic metal salts of Ca and Zr were used as the material of the fifth auxiliary component.

$Y_2O_3$ was used as the material of the sixth auxiliary component (R2), and $MnCO_3$ was used as the material of the seventh auxiliary component.

$(Ba_{0.6}Ca_{0.4})SiO_3$ being the material of the second auxiliary component was manufactured by wet-mixing $BaCO_3$, $CaCO_3$, and $SiO_2$ for 16 hours in a ball mill, drying the mixture, then burning it at 1150° C. in the air, and then wet-milling it for 100 hours in a ball mill.

On the other hand, $CaZrO_3$ being the material of the fifth auxiliary component was manufactured by wet-mixing $CaCO_3$ and $ZrCO_3$ for 16 hours in a ball mill, drying the mixture, then burning it at 1150° C. in the air, and then wet-milling it for 24 hours in a ball mill.

With respect to $BaTiO_3$ being the main component, the same characteristic was obtained by using one which was manufactured by weighing $BaCO_3$ and $TiO_2$, wet-mixing them for about 16 hours in a ball mill, drying the mixture, then burning it at 1100° C. in the air, and then wet-milling it for 16 hours in a ball mill. Further, with respect to $BaTiO_3$ being the main component, the same characteristic was obtained by using one which was manufactured by a hydrothermal synthesis method, an oxalate method, or the like.

These materials were combined such that a composition after the burning would contain 1.1 mol of MgO of the first auxiliary component, 2.5 mol of $(Ba_{0.6}Ca_{0.4})SiO_3$ of the second auxiliary component, 0.06 mol of $V_2O_5$ of the third auxiliary component, 2.00 mol of $Yb_2O_3$ of the fourth auxiliary component, 2.00 mol of $CaZrO_3$ of the fifth auxiliary component, 3.00 mol of $Y_2O_3$ of the sixth auxiliary component, and 0.3 mol of MnO of the seventh auxiliary component with respect to 100 mol of $BaTiO_3$ being the main component, then the materials were wet-mixed for about 16 hours in a ball mill, and then the mixture was dried, thereby obtaining a dielectric material. Before mixing the main component and the auxiliary components, only the auxiliary components were first mixed and dispersed, and thereafter the main component and the auxiliary components were mixed together.

100 weight parts of the dielectric material after the drying thus obtained, 4.8 weight parts of acrylic resin, 100 weight parts of ethyl acetate, 6 weight parts of mineral spirit, and 4 weight parts of toluene were mixed in a ball mill so as to be formed into paste, thereby obtaining a dielectric layer paste. The organic metal salt of Ca and Zr was dissolved in ethyl acetate and then added. Further, in order to prepare various samples having different depths of Zr diffusion layers, the ratio between $CaZrO_3$ and the organic metal salt was adjusted.

Then, 100 weight parts of Ni particles having an average particle diameter of 0.4 μm, 40 weight parts of organic vehicle (obtained by dissolving 8 weight parts of ethyl cellulose in 92 weight parts of butyl carbitol), and 10 weight parts of butyl carbitol were kneaded by three rollers so as to be formed into paste, thereby obtaining an internal electrode layer paste.

Then, 100 weight parts of Cu particles having an average particle diameter of 0.5 μm, 35 weight parts of organic vehicle (obtained by dissolving 8 weight parts of ethyl cellulose in 92 weight parts of butyl carbitol), and 10 weight parts of butyl carbitol were kneaded by three rollers so as to be formed into paste, thereby obtaining an external electrode layer paste.

Then, green sheets each having a thickness of 4.5 μm were formed on PET films, respectively, by the use of the foregoing dielectric layer paste, then the internal electrode layer paste was printed thereon, and thereafter, the green sheets were stripped from the PET films. Then, these green sheets and protective green sheets (green sheets having no internal electrode layer paste printed thereon) were stacked in layers and pressurized, thereby obtaining a green chip. The number of the sheets each having the internal electrode layer was set to four.

Then, the green chip was cut into a predetermined size and then subjected to debinding, burning, and annealing in the following manner, thereby obtaining a multilayer ceramic burned body.

Specifically, the debinding was implemented under conditions of a temperature rise rate of 15° C./hour, a holding temperature of 280° C., a holding time of 8 hours, and an air atmosphere.

The burning was implemented under conditions of a temperature rise rate of 200° C./hour, a holding temperature of 1270 to 1320° C., a cooling rate of 300° C./hour, and a humidified $N_2+H_2$ mixed gas atmosphere (oxygen partial pressure was $10^{-11}$ atm ($10^{-6}$ Pa)) as a burning atmosphere.

The annealing was implemented under conditions of a holding temperature of 900°° C., a temperature holding time of 9 hours, a cooling rate of 300° C./hour, and a humidified N₂ gas atmosphere (oxygen partial pressure was $10^{-7}$ atm ($10^{-2}$ Pa)). Use was made of a wetter with a water temperature set to 20° C. for humidification of the atmosphere gas in the burning, while use was made of a wetter with a water temperature set to 30° C. for humidification of the atmosphere gas in the annealing.

Then, after polishing end surfaces of the multilayer ceramic burned body by the use of a sandblast, the external electrode paste was transferred onto the end surfaces. Then, burning was carried out at 800° C. for 10 minutes in a humidified N₂+H₂ mixed gas atmosphere to form the external electrodes, thereby obtaining a multilayer ceramic capacitor sample.

Each of the samples thus obtained had a size of 3.2 mm×1.6 mm×0.6 mm, wherein the number of the dielectric layers each sandwiched between the internal electrode layers was four, the thickness of each dielectric layer was 3.5 μm, and the thickness of each internal electrode layer was 1.0 μm. The obtained multilayer ceramic capacitor samples were not reduced even in the burning in the reducing atmosphere and oxidation of nickel used as the internal electrode was not observed.

(Characteristic Evaluation Method and Result)

With respect to the manufactured multilayer ceramic capacitor samples, (1) Capacitance-Temperature Characteristic and (2) Average Life were evaluated.

(1) Capacitance-Temperature Characteristic

Each capacitor sample was evaluated by measuring the capacitance change ratio (%) in a temperature environment of 150° C. where the capacitance-temperature characteristic becomes the worst in the temperature range of −55 to +150° C.

The capacitance was measured by the use of an LCR meter under conditions of a frequency being 1 kHz and an input signal level being 1 Vrms. The measurement result was evaluated by judging whether or not the X8R characteristic (ΔC/C=±15% at −55 to +150° C.) was satisfied. When satisfied, "o" was given, while, when not satisfied, "x" was given.

(2) Average Life

With respect to each capacitor sample, a time (hour) in which the resistance changed by one figure was measured in an acceleration test where a DC voltage of 10.0 V/μm was applied under a temperature condition of 200° C. The number of samples subjected to the measurement was ten and the average value of the measured times (hour) was derived as an average life.

It was evaluated such that the sample having a characteristic of the average life being 10 hours or more had quite excellent reliability. It can be said that the standard of the average life being 10 hours or more is a very strict standard for a multilayer ceramic capacitor having a dielectric layer thickness of 3.5 μm and satisfying the X8R characteristic and can never be achieved by the conventional techniques.

The evaluation results are shown in Table 1 below.

The depth of a Zr diffusion layer was derived by measuring a distribution of Zr by the use of a transmission electron microscope. Each of values shown in Zr Diffusion Region (%) in Table 1 represents the ratio of the depth T of a Zr diffusion layer in a crystal grain having an average grain diameter D, i.e. a value of (T/D×100).

TABLE 1

| Sample No. | Zr diffusion Region (%) | Capacitance-Temperature Characteristic | | Average Life (hour) |
|---|---|---|---|---|
| | | Change Ratio (%) | X8R | |
| Embodiment 1 | 10 | −10.7 | (o) | 15.1 |
| Embodiment 2 | 15 | −9.3 | (o) | 20.9 |
| Embodiment 3 | 23 | −8.4 | (o) | 25.0 |
| Embodiment 4 | 30 | −12.3 | (o) | 21.0 |
| Comparative Example | 5 | −18.9 | (x) | 5.1 |
| Comparative Example | 40 | −16.9 | (x) | 0.7 |

From the foregoing results, the effects of the present invention are clear. Specifically, a multilayer ceramic capacitor of the present invention includes dielectric layers each having a main component containing barium titanate, a first auxiliary component composed of at least one kind selected from the group consisting of MgO, CaO, BaO, and SrO, a second auxiliary component containing a silicon oxide as a main component, a third auxiliary component composed of at least one kind selected from the group consisting of V₂O₅, MoO₃, and WO₃, a fourth auxiliary component composed of an oxide of at least one kind of first rare-earth element (R1) selected from the group consisting of Sc, Er, Tm, Yb, and Lu, and a fifth auxiliary component composed of CaZrO₃ or a mixture (CaO+ZrO₂) of CaO and ZrO₂. Zr diffuses in crystal grains forming the dielectric layers and, in the crystal grains each having an average grain diameter, the depth of a diffusion layer of Zr is 10 to 35% relative to the diameter of the crystal grain. Therefore, the EIA standard X8R characteristic is satisfied, the resistance change ratio in the acceleration test is small (average life is long), and the extremely high reliability is achieved.

Particularly, in the case where the dielectric layers are further reduced in thickness for the purpose of miniaturization and larger capacitance or where the rated voltage is improved, the effects of the present invention become significant. The present invention is particularly effective for a use in automobile which is used in the severe environment. Further, since the dielectric porcelain composition that is used does not contain Pb, Bi, Zn, or the like, the burning in the reducing environment is made possible so that there is also manifested an effect that the time-dependent change in capacitance under a DC electric field is small.

What is claimed is:

1. A multilayer ceramic capacitor having a multilayer structure in which dielectric layers and internal electrode layers are alternately stacked,
    wherein each of said dielectric layers comprises:
    a main component containing barium titanate;
    a first auxiliary component composed of at least one kind selected from the group consisting of MgO, CaG, BaO, and SrO;
    a second auxiliary component containing a silicon oxide as a main component;
    a third auxiliary component composed of at least one kind selected from the group consisting of V₂O₅, MoO₃, and WO₃;
    a fourth auxiliary component composed of an oxide of at least one kind of first rare-earth element (R1) selected from the group consisting of Sc, Er, Tm, Yb, and Lu; and
    a fifth auxiliary component composed of CaZrO₃ or a mixture (CaO+ZrO₂) of CaO and ZrO₂, wherein, with respect to 100 mol of the main component containing barium titanate, the content (mol) of the first auxiliary component is given as y1, the content (mol) of the second auxiliary component is given as y2, the content (mol) of the third auxiliary component is given as y3, the content (mol) of the fourth auxiliary component is given as y4, and the content (mol) of the fifth auxiliary component is given as y5, a value of y1 falls within the range of 0.1 to 3.0 mol, a value of y2 falls within the range of 2 to 10 mol, a value of y3 falls within the range of 0.01 to 0.5 mol, a value of y4 falls within the range of 0.5 to 7 mol (representing the content of R1 alone), and a value of y5 is 5 mol or less (not including zero), wherein Zr diffuses in crystal grains forming said dielectric layers and, in the crystal grains each having an average grain diameter, a depth of a diffusion layer of Zr is 10 to 35% relative to the diameter of the crystal grain, and wherein said depth of the diffusion of Zr is adjusted with a liquid phase addition of organic metal salts of Ca and Zr.

2. The multilayer ceramic capacitor according to claim 1, wherein the average grain diameter of the crystal grains forming said dielectric layers is 0.2 to 0.55 μm.

3. The multilayer ceramic capacitor according to claim 1, wherein the average grain diameter of the crystal grains forming said dielectric layers is 0.2 to 0.35 μm.

4. The multilayer ceramic capacitor according to claim 1, wherein said second auxiliary component containing the silicon oxide as the main component is a composite oxide containing $SiO_2$ as a main component and at least one kind selected from the group consisting of MO (M is at least one kind of element selected from the group consisting of Ba, Ca, Sr, and Mg), $Li_2O$, and $B_2O_3$.

5. The multilayer ceramic capacitor according to claim 1, wherein said second auxiliary component containing the silicon oxide as the main component is $(Ba, Ca)_x SiO_{2+x}$ where x is 0.7 to 1.2.

6. The multilayer ceramic capacitor according to claim 1, wherein each of said dielectric layers has a thickness of 2 to 7 μm.

* * * * *